US011899988B2

(12) United States Patent
Iwasaki

(10) Patent No.: US 11,899,988 B2
(45) Date of Patent: Feb. 13, 2024

(54) INFORMATION PROCESSING APPARATUS, CONTROL METHOD THEREOF, AND STORAGE MEDIUM

(71) Applicant: CANON KABUSHIKI KAISHA, Tokyo (JP)

(72) Inventor: Yukiyasu Iwasaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/667,812

(22) Filed: Feb. 9, 2022

(65) Prior Publication Data
US 2022/0276810 A1 Sep. 1, 2022

(30) Foreign Application Priority Data
Feb. 26, 2021 (JP) ................................. 2021-030369

(51) Int. Cl.
*G06F 3/12* (2006.01)
(52) U.S. Cl.
CPC .......... *G06F 3/1206* (2013.01); *G06F 3/1253* (2013.01)
(58) Field of Classification Search
CPC .... G06F 3/1206; G06F 3/1253; G06F 3/1228; G06F 3/1247; G06F 3/1285
See application file for complete search history.

(56) References Cited

U.S. PATENT DOCUMENTS

| 6,278,528 B1* | 8/2001 | Ohtsuka | G06F 3/1285 358/1.15 |
| 2004/0120000 A1* | 6/2004 | Onuma | G06F 3/1284 358/1.14 |
| 2008/0037059 A1* | 2/2008 | Inoue | G06F 3/1285 358/1.15 |
| 2009/0213395 A1* | 8/2009 | Ozaki | H04N 1/00204 358/1.9 |
| 2017/0087882 A1* | 3/2017 | Shinjo | B41J 11/0065 |

FOREIGN PATENT DOCUMENTS

JP 2005-078154 A 3/2005

OTHER PUBLICATIONS

Yakiyasu Iwasaki, U.S. Appl. No. 17/567,266, filed Jan. 3, 2022.

* cited by examiner

*Primary Examiner* — Huo Long Chen
(74) *Attorney, Agent, or Firm* — VENABLE LLP

(57) ABSTRACT

An information processing apparatus generates print data in a first format and communicates with a printing apparatus, and obtains, from OS standard print software which operates in a computer, print data in a second format different from the first format and including document data, print setting by a user, and information related to paper indicating a paper size supported by the printing apparatus, converts the print data such that a size of the document data is converted in a case where a predetermined condition is satisfied, and generates the converted print data as the print data in the first format and sends the generated print data to the printing apparatus. The predetermined condition includes a condition that, among the information related to paper, one or more sizes associated with a regular size specified based on the print setting include an irregular size different from the specified regular size.

17 Claims, 15 Drawing Sheets

| PAPER SIZE | A2 | A2 OVERSIZE | A2 BORDERLESS | A3 | A3 OVERSIZE | A3 BORDERLESS | A4 |
|---|---|---|---|---|---|---|---|
| WIDTH | 42000 | 42000 | 42600 | 29700 | 29700 | 30300 | 21000 |
| HEIGHT | 59400 | 59400 | 60000 | 42000 | 42000 | 42600 | 29700 |
| TOP MARGIN | 300 | 0 | 0 | 300 | 0 | 0 | 300 |
| LEFT MARGIN | 300 | 0 | 0 | 300 | 0 | 0 | 300 |
| RIGHT MARGIN | 300 | 0 | 0 | 300 | 0 | 0 | 300 |
| BOTTOM MARGIN | 300 | 0 | 0 | 300 | 0 | 0 | 300 |

Source : aaaa — 701
Internet Printing Protocol
   Version : 2.0
   Operation-id : Create-Job
   Request ID : 1
   Operation attributes
      printer-uri : ipp://xxx.xxx — 702
      user-name : User A — 703
   Job attributes
      media-size — 704
         x-dimension : 42000 — 705
         y-dimension : 59400 — 706
         media-bottom-margin : 0 — 707
         media-left-margin : 0 — 708
         media-right-margin : 0 — 709
         media-top-margin : 0 — 710
      media-source : tray — 711
      media-type : photo paper — 712

FIG.7

|  | PRINTER 1 ipp://xxx.xxx | PRINTER 2 ipp://yyy.yyy | PRINTER 3 ipp://zzz.zzz |
|---|---|---|---|
| USER A | EXPANSION | EXPANSION | EXPANSION |
| USER B | EXPANSION | EQUAL | EQUAL |
| USER C | EQUAL | EQUAL | EQUAL |
| OTHER | EXPANSION | EQUAL | EQUAL |

FIG.8

|  | PRINTER 1 ipp://xxx.xxx | PRINTER 2 ipp://yyy.yyy | PRINTER 3 ipp://zzz.zzz |
|---|---|---|---|
| PHOTO PAPER | MARGIN : 600 | MARGIN : 600 | MARGIN : 300 |
| TRAY | MARGIN : 600 | MARGIN : 600 | MARGIN : 600 |
| OTHER | MARGIN : 300 | MARGIN : 300 | MARGIN : 300 |

FIG.10

INFORMATION PROCESSING APPARATUS, CONTROL METHOD THEREOF, AND STORAGE MEDIUM

BACKGROUND

Field

The present disclosure relates to a technique to convert document data included in a print job.

Description of the Related Art

Conventionally, as the print function of a specific printer driver provided by a printer vendor, there is a technique to detect a paper size set in a main body of a printer to convert print data according to the detected size (Japanese Patent Laid-Open No. 2005-78154 (hereinafter referred to as PTL 1).

SUMMARY

There is a technique in which an operating system (OS) provides a standard print function (OS standard print function) without requiring the specific printer driver provided by the printer vender as in PTL 1. In this case, using a print conversion utility for a printer not compatible with the OS standard print function makes it possible to convert a print standard protocol conforming to the OS standard print function into a printer-specific protocol.

However, in an environment of the OS standard print function, there is a possibility that the paper sizes displayed by the conventional specific printer driver as specific names and uniquely defined according to specifications of the printer, or paper sizes with no margin of paper at the top, bottom, right, and left are displayed as different names. This may bring a case where desired print result cannot be obtained.

An information processing apparatus according to an aspect of the present disclosure is capable of generating print data in a first format and communicating with a printing apparatus and comprises:

an obtaining unit configured to obtain, from OS standard print software which operates in a computer, print data in a second format different from the first format, the print data in the second format comprising document data and print setting by a user;

a conversion unit configured to convert the print data such that a size of the document data is converted in a case where the print setting satisfies a predetermined condition; and a sending unit configured to generate the print data converted by the conversion unit as the print data in the first format and send the generated print data to the printing apparatus.

Further features of the present disclosure will become apparent from the following description of exemplary embodiments with reference to the attached drawings.

BRIEF DESCRIPTION OF THE DRAWINGS

FIG. 2 is a diagram showing information on paper sizes supported by a printer;

FIG. 7 is a diagram showing a print job of IPP, which is a standard print protocol;

FIG. 8 is a diagram showing information about a data conversion method according to a user;

FIG. 10 is a diagram showing information about a data conversion method according to print setting;

DESCRIPTION OF THE EMBODIMENTS

Suitable embodiments of the present disclosure will be described below in detail with reference to the attached drawings. It should be noted that the following embodiments do not limit the present disclosure according to the claims and not all of the combinations of features described in the present embodiments are essential as solving means of the present disclosure.

First Embodiment

A printer not compatible with (not supporting) a standard function (OS standard print function) necessary in a case of generation of print data cannot use the OS standard print function. More specifically, the printer not compatible with the OS standard print function cannot interpret print data in a predetermined format (hereinafter also referred to as "standard format") specified by the OS standard print function. Thus, in the present embodiment, print control software called print conversion utility is used. The print control software enables a print instruction using the OS standard print function by making the printer not having the OS standard print function look as if it is compatible with the OS standard print function. The print conversion utility is installed and used on a personal computer (PC) with an OS installed thereon. The print conversion utility may be provided in a computer different from the PC with the OS installed thereon.

In response to an inquiry from the OS about capability information, the print conversion utility informs as a proxy the capability of the printer not compatible with the OS standard print function. The print conversion utility also converts print data in the standard format (print data in a second format) into print data (print data in a first format) in a format supported by the printer (a printer vendor-specific format, for example) and sends the converted data. The print data is also referred to as a print command. In a case where the print conversion utility is installed on the PC, the print conversion utility converts communication with the printer according to a printer-specific protocol into communication conforming to the OS standard print function. Thus, even a printer not compatible with the OS standard print function can issue the print instruction from the PC using the OS standard print function. The present embodiment is an embodiment in which such a print conversion utility is used.

[System Configuration]

Figure 1A:
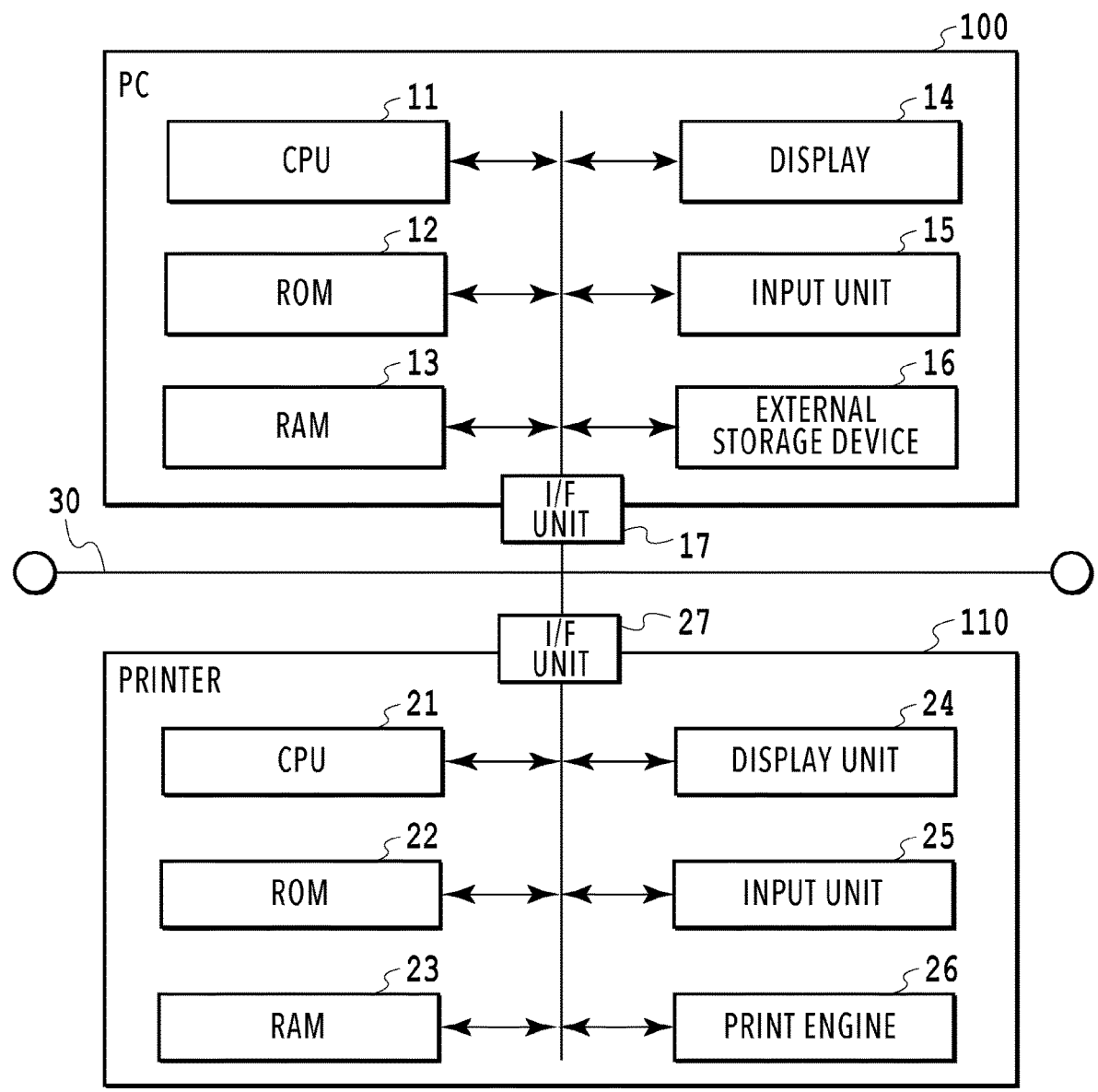
FIGS. 1A and 1B are diagrams showing entire configurations of a print system of the present embodiment.
Figure 1B:
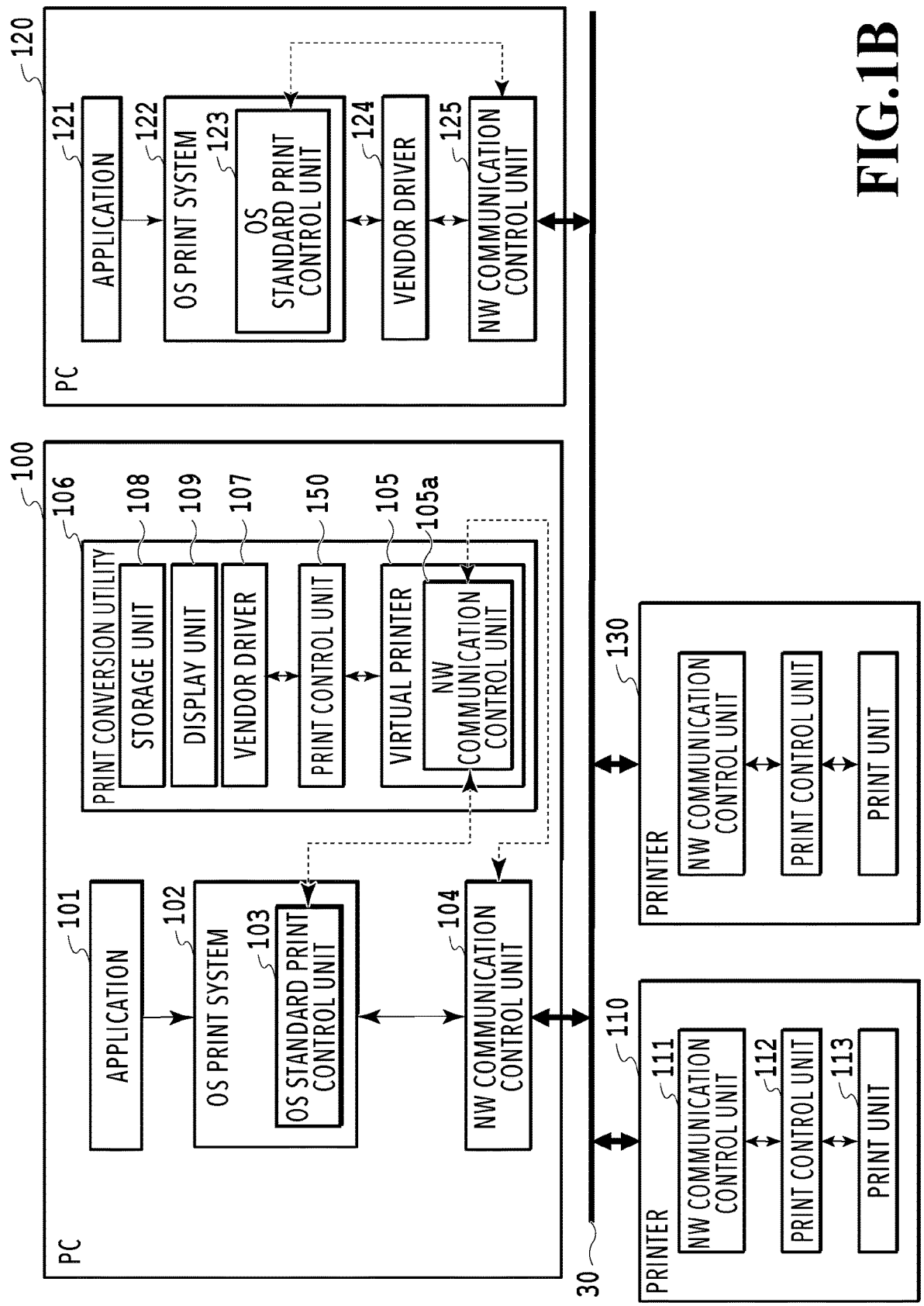

FIGS. 1A and 1B are block diagrams showing a hardware configuration and a software configuration of a print system of the present embodiment. FIG. 1A is a diagram showing the hardware configuration of the print system and FIG. 1B is a diagram showing the software configuration of the print system. First, FIG. 1A will be described. The present embodiment shows an example of the print system in which a PC 100 as a host computer can communicate with a printer 110 via a communication bus 30 (network) such as a LAN (Local Area Network). Although the LAN is assumed as the network in the present embodiment, the network may be a WAN (Wide Area Network). The network connection may be wired and/or wireless. The connection between the PC 100 and the printer 110 may be a USB (Universal Serial Bus). Although only one printer is illustrated in FIG. 1A, any number of printers can be connected with the PC 100 via the communication bus 30. As shown in FIG. 1B, an example in which the printer 110 and a printer 130 are used is described in the present embodiment.

The PC 100 is an example of an information processing apparatus. An operating system (hereinafter referred to as OS) is installed on the PC 100. The OS includes an OS print system to be described later which is OS standard print software.

The PC 100 is a personal computer (PC) for example, and includes an interface (I/F) unit 17, a CPU 11, a ROM 12, a RAM 13, a display 14, an input unit 15, and an external storage device 16. The PC 100 of the present embodiment is not limited to a desktop PC and may be a portable terminal such as a notebook PC, a tablet PC, or a smart phone.

The PC 100 sends, to the printer 110, an instruction of control of the printer 110, print data, a setting command, or the like. The CPU 11 is a central processing unit which controls respective units of the PC 100, and executes a control program such as the OS. The ROM 12 controls system operation by the stored OS. The RAM 13 is a random access memory in which a work area used by the CPU 11 is developed. The external storage device 16 stores various control programs such as an application.

The input unit 15 is an input device such as a keyboard and a mouse for operating the PC 100. The display 14 is a display device which performs display for confirming information input by the input unit 15, or display of a user interface screen of the OS or the application, display of a message, and the like. The I/F unit 17 is a communication module which performs sending and receiving of data with the printer 110.

The printer 110 which is a printing apparatus is an ink jet printer, for example. The printer 110 includes an I/F unit 27, a CPU 21, a ROM 22, a RAM 23, a display unit 24, an input unit 25, and a print engine 26. The CPU 21 is a central processing unit which controls the following respective units. The ROM 22 is a read-only memory, and stores a program which controls the print engine 26. The RAM 23 is a random writing and reading memory, and temporarily stores a program necessary for operation of the print engine 26, a setting value received from the PC 100, and the like. The input unit 25 is a button or the like for operating the printer 110. The display unit 24 is a display device which performs display for confirming information input by the input unit 25, or display of a status message of the printer 110, and the like.

The print engine 26 performs printing on a print medium based on print data sent from the PC 100. The I/F unit 27 is a communication module which receives print data from the PC 100, and includes the function of sending current status information about the printer 110 from the printer 110 to the PC 100. The status information described here is status data which can be returned to the PC 100 by the printer 110 and the status data represents the status of the printer 110 in response to a request from the PC 100 connected via the I/F unit 27. The status data is information for notifying the status of operation of the printer 110 such as "printing in progress" or "on standby" and the error status of the printer 110 such as "out of paper," "the cover is open," or "no remaining ink." Since the configuration of the printer 130 is the same as that of the printer 110, description thereof will be omitted. In the present embodiment, the printer 110 is a printer compatible with the OS standard print function, and the printer 130 is a printer not compatible with the OS standard print function.

Next, FIG. 1B will be described. First, the software configuration of the PC 100 will be described. The PC 100 includes an application 101, an OS print system 102, a network (NW) communication control unit 104, and a print conversion utility 106. The OS print system 102 includes an OS standard print control unit 103. The print conversion utility 106 includes a virtual printer 105, a vendor driver 107, a storage unit 108, a display unit 109, and a print control unit 150. The virtual printer 105 has a NW communication control unit 105a. The vendor driver 107 converts print data in a format conforming to the OS standard print function received by the virtual printer 105 into print data in a vendor-specific format. The print control unit 150 performs display control of a setting screen related to printing, generation of print data, or the like. The print conversion utility 106 is software used for enabling a printer not compatible with OS standard print to use the OS standard print function, and is installed on the PC 100 as necessary. The application 101 is software operable on the OS which is basic software of the PC 100. Examples of the application 101 include word processing software for document creation, image editing software, and a drawing application for a web browser or the like. Drawing data which can be generated by the application 101 is data in a PDF (Portable Document Format) for example.

The OS print system 102 is an element of the OS, performs print control, and sequentially processes print requests from the application 101 as jobs. The OS standard print control unit 103 included in the OS print system 102 is software having the OS standard print function. The OS standard print control unit 103 performs spool processing on the drawing data generated by the application 101 to generate print data in a predetermined format (referred to as standard format). The OS standard print control unit 103 also performs processing in which the print data in the standard format is output to the NW communication control unit 104 in order to send the generated print data in the standard format to the printer 110. The OS standard print control unit 103 of the present embodiment communicates with the printer 110 via the NW communication control unit 104 using IPP (Internet Printing Protocol), which is a standard print protocol. Further, the OS standard print control unit 103 obtains capability information about the printer 110 via the NW communication control unit 104 in order to determine whether the printer 110 supports the OS standard print function.

A flow in a case of the print instruction will be described below. After generation of the drawing data, the application 101 makes a print request to the OS print system 102 based on a user instruction. The print request is input to a print queue of the OS print system 102 as a print job. In a case of making the print request, as to print setting, a setting instruction from a user can be received through the setting screen provided by the OS standard print function.

In a case where the print request is made, the print job (print data) including information about the print setting and the drawing data (document data) generated by the application 101 is sent from the application 101 to the OS print system 102. The information about the print setting includes information about a paper size, a paper feeding method, which print queue is to be used to perform printing, or the like.

In order to make the print instruction via the print conversion utility 106, it is necessary to register in advance print queues both of the OS print system 102 for receiving the print request from the application 101 and of the print conversion utility 106. The print queue of the print conversion utility 106 is a queue for inputting the print data sent to the virtual printer 105. It should be noted that in a case of registration of setting, the print queue of the print conversion utility 106 is first registered, whereby the print conversion utility 106 activates the virtual printer 105. After that, the print conversion utility 106 designates the virtual printer 105 to automatically register the print queue of the OS print system 102.

Upon receipt of the print job, the OS standard print control unit 103 of the OS print system 102 generates the print data in the predetermined format conforming to the OS standard print function (print data in the second format).

The printer 110 compatible with the OS standard print function is a printer capable of interpreting print data in a format conforming to the OS standard print function. The OS print system 102 sends the generated print data to a printer compatible with the OS standard print like the printer 110 via the NW communication control unit 104.

On the other hand, the printer 130 not compatible with the OS standard print cannot interpret the print data in the format conforming to the OS standard print function. For this reason, the user can perform printing using the printer 130 by using the print conversion utility 106. In a case of a print job for the printer 130 not compatible with the OS standard print function (a print job in which the virtual printer 105 is designated as an output destination printer), the OS print system 102 sends the generated print data to the virtual printer 105 that the print conversion utility 106 has activated. The print conversion utility 106 then converts, by the vendor driver 107, the print data in the format conforming to the OS standard print function received by the virtual printer 105 into print data in a vendor-specific format. That is, the print conversion utility 106 generates print data in a first format which can be interpreted by the printer 130 from the print data in the second format. The generated print data is sent to the printer 130 not compatible with the OS standard print function via the NW communication control unit. In the present embodiment, it is assumed that the virtual printer 105 in the PC 100 is activated.

The printer 110 and the printer 130 include a NW communication control unit 111, a print control unit 112, and a print unit 113. The print control unit 112 receives the print data from the PC 100 via the NW communication control unit 111 such that the print unit 113 is controlled to perform printing based on the print data.

The storage unit 108 included in the print conversion utility 106 retains information related to paper supported by a printer registered as the virtual printer. The information related to paper will be described later with reference to FIG. 2. The information related to paper may be retained in advance in the storage unit 108 of the print conversion utility 106 or may be obtained and retained by communicating with the printer.

The display unit 109 included in the print conversion utility 106 displays status information about the virtual printer 105 such as "out of paper," "the cover is open," or "no remaining ink" and status information about the print job such as "printing in progress" or "on standby" on the display 14 of the PC 100.

Next, the software configuration of a PC 120 will be described. The PC 120 includes an application 121, an OS print system 122, a vendor driver 124, and a NW communication control unit 125. The OS print system 122 includes an OS standard print control unit 123. The vendor driver 124 is a printer driver specific to the printer 130 and is installed on the PC 120 as necessary to use the printer 130. Similarly to the application 101, the application 121 is software operating on an OS which is basic software of the PC 120.

Since the vendor driver 124 is installed on the PC 120, it is possible for the vendor driver 124 to generate print data in a vendor-specific format which can be interpreted by the printer 130 to execute printing by the printer 130.

Similarly to the flow in a case of the print instruction in the PC 100 described above, the OS print system 122 sequentially processes print requests from the application 121 as jobs. After generation of drawing data, the application 121 makes a print request to the OS print system 122 based on a user instruction. The print request is input to the OS print system 122 as a print job. In a case of making the print request, as to print setting, a setting instruction from the user can be received through a setting screen provided by the vendor driver 124. In a case where the print request is made, a print job including information about the print setting and the drawing data generated by the application 121 is sent from the application 121 to the vendor driver 124 via the OS print system 122. The information about the print setting includes information about a paper size, a paper feeding method, in which print queue printing is to be performed, or the like.

Upon receipt of the print job, the vendor driver 124 generates print data in a vendor-specific format. The printer 130 compatible with the vendor driver 124 is capable of interpreting the print data in the vendor-specific format and the vendor driver 124 sends the generated print data to the printer 130 not compatible with the OS standard print via the NW communication control unit 125.

FIG. 2 is a diagram showing a list of information related to paper including information about paper sizes supported by the printer 130. In FIG. 2, seven supported paper sizes which are A2, A2 Oversize, A2 Borderless, A3, A3 Oversize, A3 Borderless, and A4 are described as examples. "Oversize" and "Borderless" in FIG. 2 correspond to an oversize and a borderless size, respectively. Since margins necessary for operation are set in a printer, in a case of normal printing, margins in which no printing is performed appear in amounts corresponding to the above set margins at four edges of a product (print result). Both of oversize printing and borderless printing are the function of performing printing such that no margin will eventually appear on the product.

First, the oversize printing is a method of printing by adding in advance margins (margins necessary for printer operation) at four edges of a print document with the size of the print document kept as it is so as to perform printing on paper of a size larger than the size of the print document by the above margins. The user cuts off the margins of the paper after the printing, whereby a product on which the document is printed fully using the print paper can be eventually obtained. On the other hand, the borderless printing is different from the oversize printing and in a case of printing, by outputting a print document the size of which is larger than a paper size in order not to leave any margin at the edges of the paper, the print document is printed on the paper with the print document having a size such that the print document protrudes from the paper. As a result of this, a product on which the print document is printed fully using the paper of a designated size can be eventually obtained. The borderless printing means such a print function. Thus, the result produced by performing the borderless printing is output with the four edges of the original document being not printed. The information related to paper includes a name 200 of a paper size that the printer 130 is compatible with, a paper width size 201, a paper height size 202, a top margin size 203, a left margin size 204, a right margin size 205, and a bottom margin size 206. The paper width size 201, the paper height size 202, the top margin size 203, the left margin size 204, the right margin size 205, and the bottom margin size 206 are expressed in units of 1/100 mm.

Although the following matter will also be described later, in a case where the borderless printing is executed using the OS standard print function, the print result sometimes becomes a result contrary to the intention of the user. For example, there is a case where although printing is performed with the intention of the borderless printing, output is performed using the oversize printing. Therefore, in the present embodiment, in a case of performing the borderless printing using the OS standard print function, the information related to paper is used to convert the paper size such that a print result intended by the user can be obtained.

Figure 3:
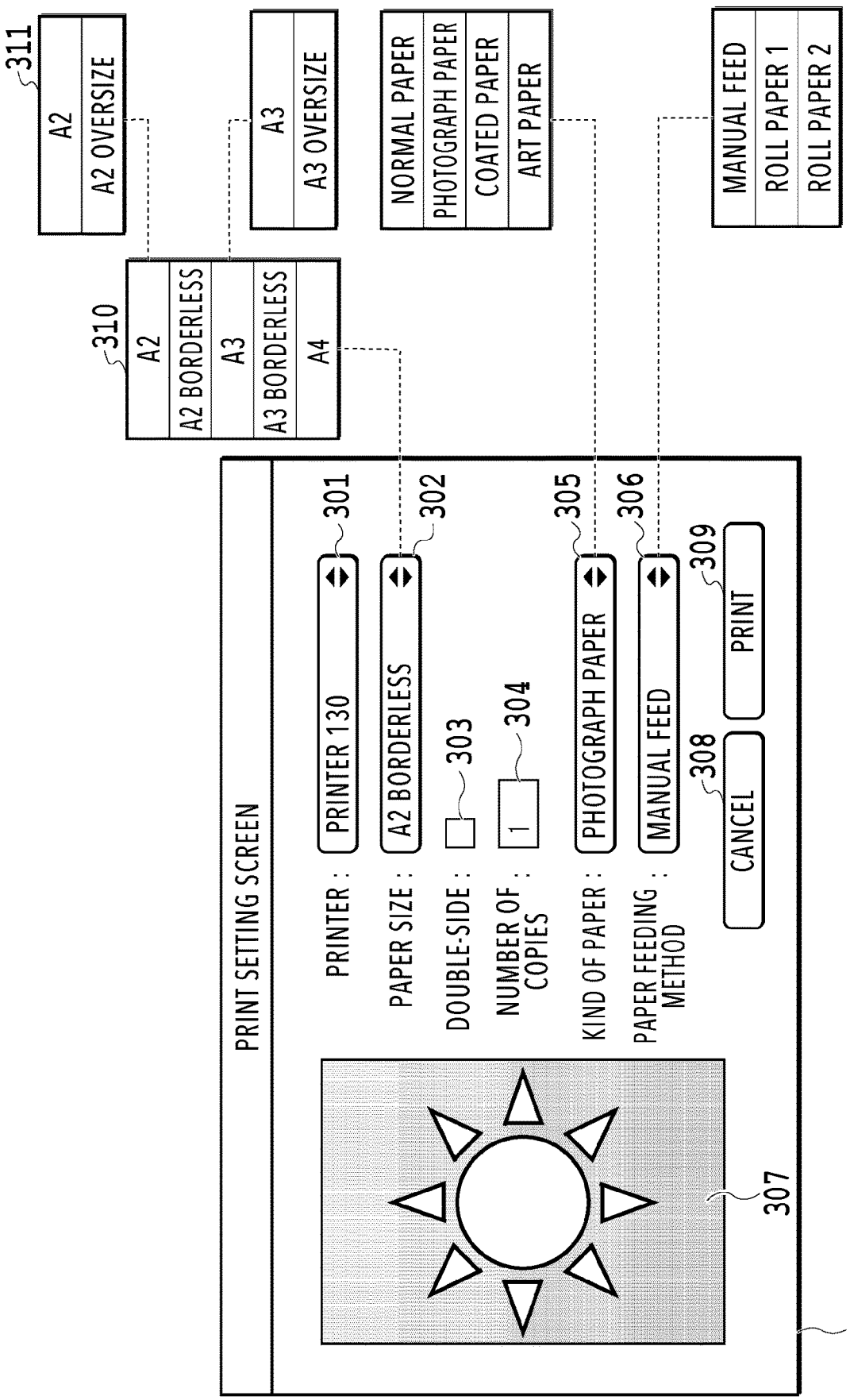
FIG. 3 is a diagram showing a print setting screen in an environment of a printer driver.

FIG. 3 is a schematic diagram showing a print setting screen 300 provided by the vendor driver 124. As shown in FIG. 3, the print setting screen 300 includes a printer selection item 301 for selecting a printer to be caused to execute printing, a paper size selection item 302, a double-side printing selection item 303, an item for selecting the number of copies 304, and an item for selecting the kind of paper 305. The print setting screen 300 also includes a paper feeding method selection item 306, a print preview region 307, a cancel button 308, and a print button 309. In a case where the paper size selection item 302 is selected, a paper size selection list 310 is displayed. On the paper size selection list 310, paper sizes equal in the paper width size 201 and the paper height size 202 like A2 and A2 Oversize in FIG. 2 are displayed as one size. In a case where A2 of the paper size selection list 310 is selected, a margin size selection list 311 is displayed. In other words, A2 and A2 oversize of the margin size selection list 311 are both sizes equal in the paper width size 201 and the paper height size 202 and different in top, left, right, and bottom margin sizes 203 to 206 like A2 and A2 Oversize in FIG. 2.

FIG. 3 shows print setting in a case where the user performs printing with the A2 borderless size. On the print setting screen 300 of the vendor driver 124, the names 200 of paper sizes that the printer 130 is compatible with are displayed in the paper size selection item 302, the paper size selection list 310, and the margin size selection list 311. In the print preview region 307, a print preview image showing a print result produced according to the respective sizes 201 to 206 of paper selected by the user in the paper size selection item 302 is displayed. The user who has confirmed the print preview then specifies the print button 309, whereby the print request is performed.

Figure 4:
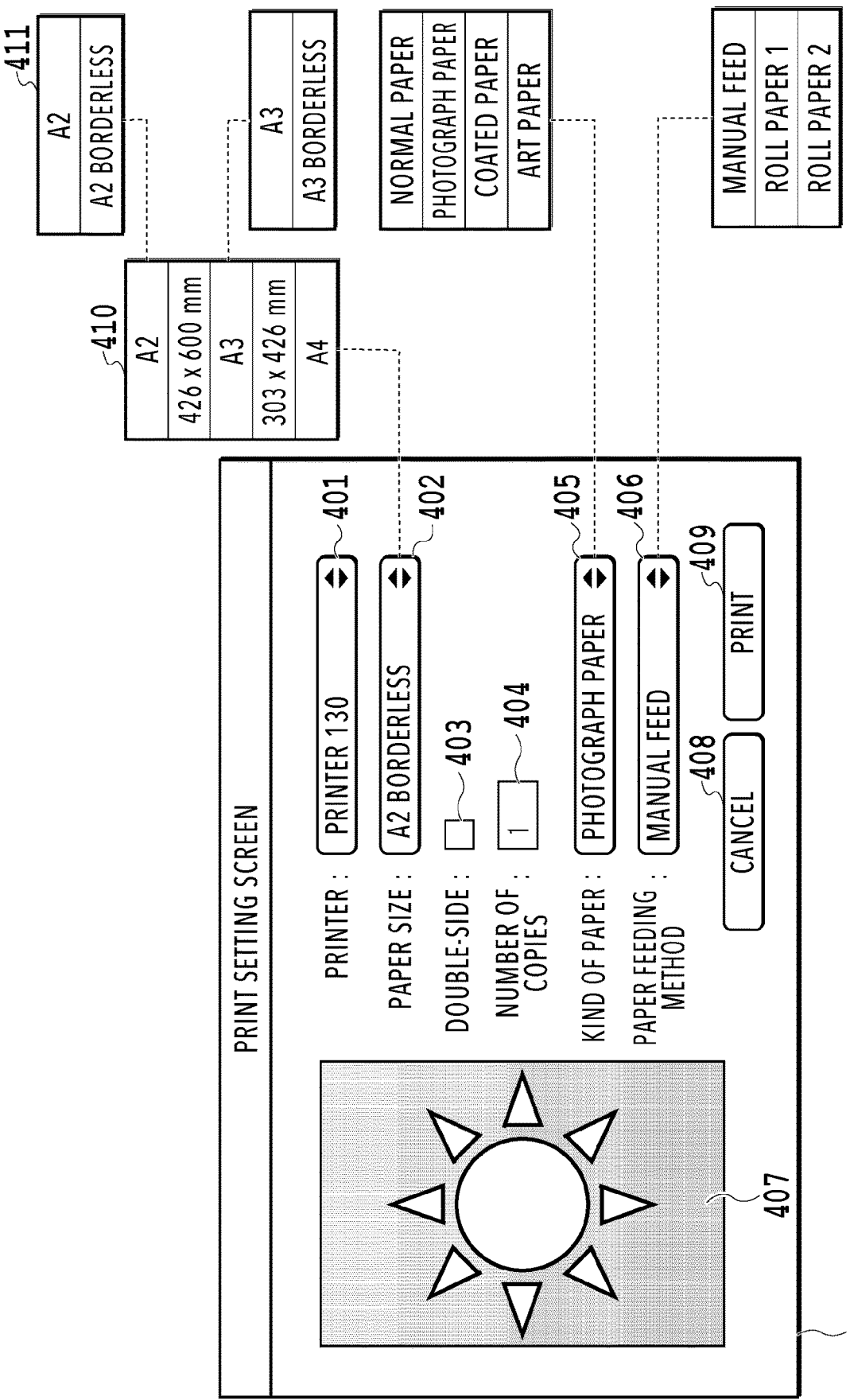
FIG. 4 is a diagram showing a print setting screen in an environment of an OS standard print function.

FIG. 4 is a schematic diagram showing a print setting screen 400 provided by the OS standard print control unit 103. The print setting screen 400 includes a printer selection item 401 for selecting a printer to be caused to execute printing, a paper size selection item 402, a double-side printing selection item 403, an item for selecting the number of copies 404, and an item for selecting the kind of paper 405. The print setting screen 400 also includes a paper feeding method selection item 406, a print preview region 407, a cancel button 408, and a print button 409. In a case where the paper size selection item 402 is selected, a paper size selection list 410 is displayed. On the paper size selection list 410, paper sizes equal in the paper width size 201 and the paper height size 202 like A2 and A2 Oversize in FIG. 2 are displayed as one size. In a case where A2 of the paper size selection list 410 is selected, a margin size selection list 411 is displayed. In other words, A2 and A2 borderless of the margin size selection list 411 are both sizes equal in the paper width size 201 and the paper height size 202 and different in top, left, right, and bottom margin sizes 203 to 206 like A2 and A2 Oversize in FIG. 2.

FIG. 4 shows print setting in a case where the user performs printing with the A2 borderless size. On the print setting screen 400 provided by the OS standard print function, names corresponding to sizes 201 to 206 of paper sizes that the printer 130 is compatible with are displayed in the paper size selection item 402, the paper size selection list 410, and the margin size selection list 411. For example, a size having the margin sizes 203 to 206 of zero like A2 Oversize in FIG. 2 is displayed as a name "borderless." Further, a size such as A2 Borderless in FIG. 2 which is not defined by the OS standard print function because the size is different in the paper width size 201 and the paper height size 202 from the A2 size is displayed as a name of a customized-size "426×600 mm." In addition to the above cases, in the OS standard print function, since the specifications of individual printers cannot be considered, a paper size other than regular sizes is displayed as a customized-size and a paper size with no margin at the top and bottom and right and left of the paper is displayed as a borderless size.

It can be seen from FIGS. 3 and 4 that although the user intends to select the A2 borderless size, a different size is selected in each of a case where the vendor driver 124 is used and a case where the OS standard print control unit 103 is used. As a result, a print result desired by the user may not be obtained. Description will be specifically given below with reference to a drawing.

Figure 5:
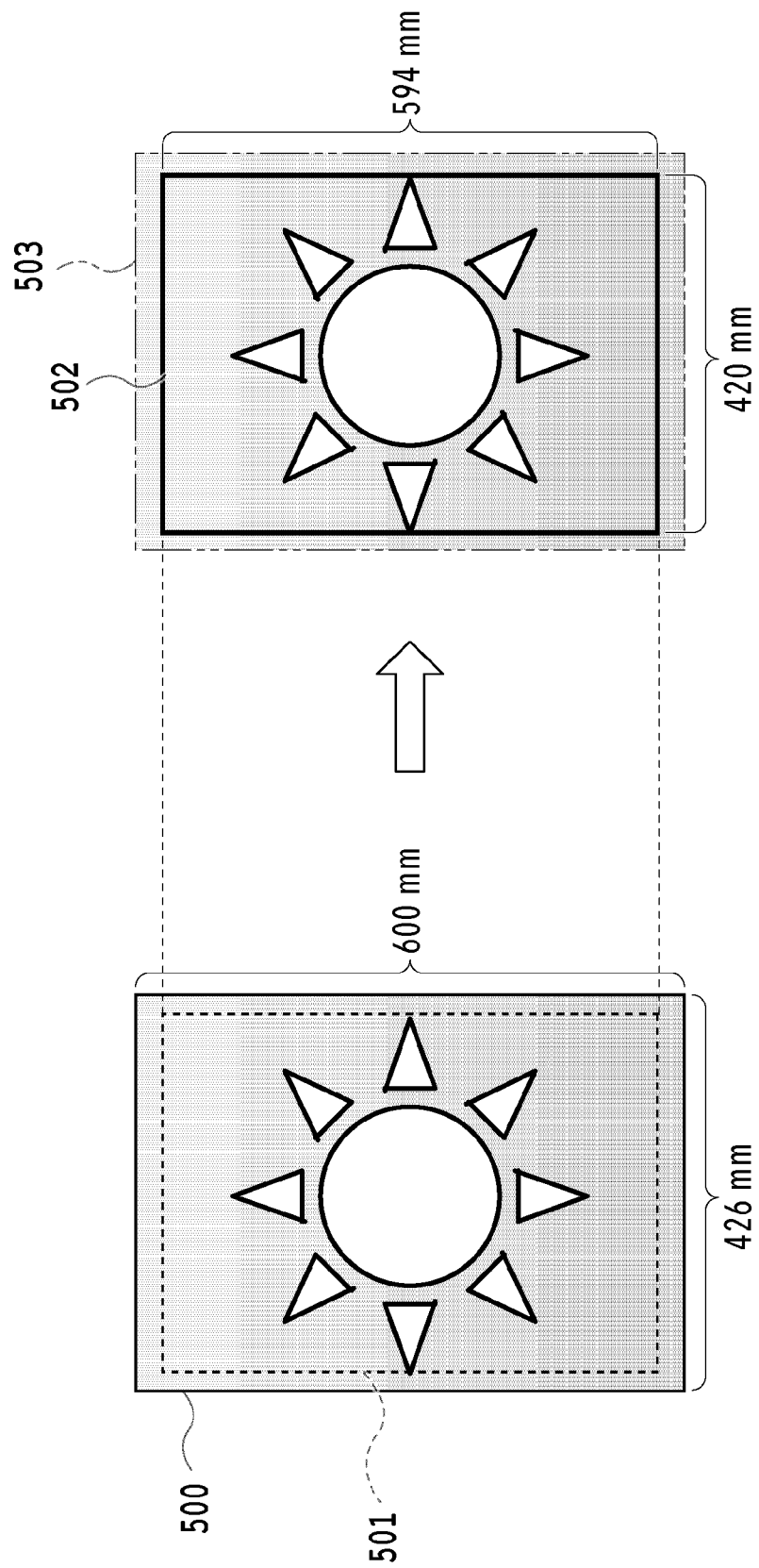
FIG. 5 is a diagram showing print result in a case of an A2 borderless size using the printer driver.

FIG. 5 is a diagram showing document data and a print result in a case of performing printing with the A2 borderless size by the vendor driver 124. As described above, the "borderless printing" used by the vendor driver 124 means the print function in which in the case of printing, the print document is printed on paper with the print document having a size such that the print document protrudes from the paper. Thus, the result produced by performing the borderless printing is output with the four edges of the original document being not printed. Therefore, with a matter that the four edges are not printed in mind, the user trying to perform the "borderless printing" by the vendor driver 124 generates the document data. FIG. 5 shows document data 500 the size of which is 426×600 mm, which is the A2 borderless size larger than the A2 size (420×594 mm). Unmagnification printing is performed on A2 paper which is the regular size using such document data, whereby printing is performed with the four edges, which are top, bottom, right, and left edges, of the document data 500 protruding from the paper and a borderless printing result 502 can be obtained. The borderless printing result 502 can be obtained by performing printing with the four edges, which are top, bottom, right, and left edges, protruding from the paper. Thus, the user is conscious that the document 500 is created based on the assumption that data which is not to be printed at four edges of the paper, which are top, bottom, right, and left edges, is added to a borderless print region 501 the size of which is equal to the A2 regular size.

In a case where the user uses the document data 500 shown in FIG. 5 and selects the A2 borderless size as on the print setting screen 300 to execute printing by the vendor driver 124, the borderless printing result 502 shown in FIG. 5 can be obtained. Since a protruding region 503 is printed outside the A2 regular size paper, this region is not printed on the A2 regular size paper.

In contrast, in a case where the user uses the document data 500 shown in FIG. 5 and selects the A2 borderless size as on the print setting screen 400 of the OS standard print function to execute printing, the borderless printing result 502 shown in FIG. 5 cannot be obtained. As described above, the A2 borderless size on the print setting screen 400 of the OS standard print function corresponds to the A2 oversize on the print setting screen 300 of the vendor driver 124. For this reason, even in a case where the user generates data of the A2 borderless size (426×600 mm) larger than the A2 size (420×594 mm), print data in which the document data 500 has been reduced to A2 size (420×594 mm) is generated by using the OS standard print function and is sent to the print conversion utility 106 with the A2 size (420×594 mm) kept as it is. In a case of not performing processing to be described below, the print conversion utility 106 makes the print instruction to the printer 130 using the print data sent from the OS print system 102. As a result, even though the user is conscious of the "borderless printing" by the vendor driver 124 to make the print instruction, printing is not performed with the four edges of the document protruding from the paper but is performed with the document reduced to the A2 regular size.

As described above, in the environment of using the OS standard print function, selecting a paper size displayed in a case of using the vendor driver 124 does not bring the same print result as that in a case of using the vendor driver 124. Thus, the desired print result cannot be obtained. In a case where the users performing the borderless printing all use data in which the four edges, which are top, bottom, right, and left edges, are not printed as in the document data 500, processing in which the data is uniformly enlarged to the size of 426×600 mm by the print conversion utility 106 may be performed. However, some users use all of the four edges, which are top, bottom, right, and left edges, of the document data as data to be printed as in the oversize printing. Thus, it is required that processing be performed differentiating between performing the enlarging processing and performing the unmagnification processing. In addition, the print conversion utility 106 cannot obtain the size of document data designated by the application to the OS print system 102 and can only obtain document data of a size set by the OS standard print control unit 103. This makes it impossible for the OS print system 102 to distinguish whether the document data is kept unmagnified or whether the document data is reduced.

In view of this, in the present embodiment, in a case where the OS standard print function is used to perform printing by the printer not compatible with the OS standard print function, processing in which the size of the document data is converted to output it to the printing apparatus is performed in order to obtain a desired print result in response to the user executing the printing. Control in the present embodiment will be described below in detail. It should be noted that in the following descriptions, "borderless printing" by the vendor driver 124 may be referred to as "protruding borderless printing" with the intention of differentiating between "borderless printing" by the vendor driver 124 and "borderless printing" by the OS standard print function.

Figure 6:
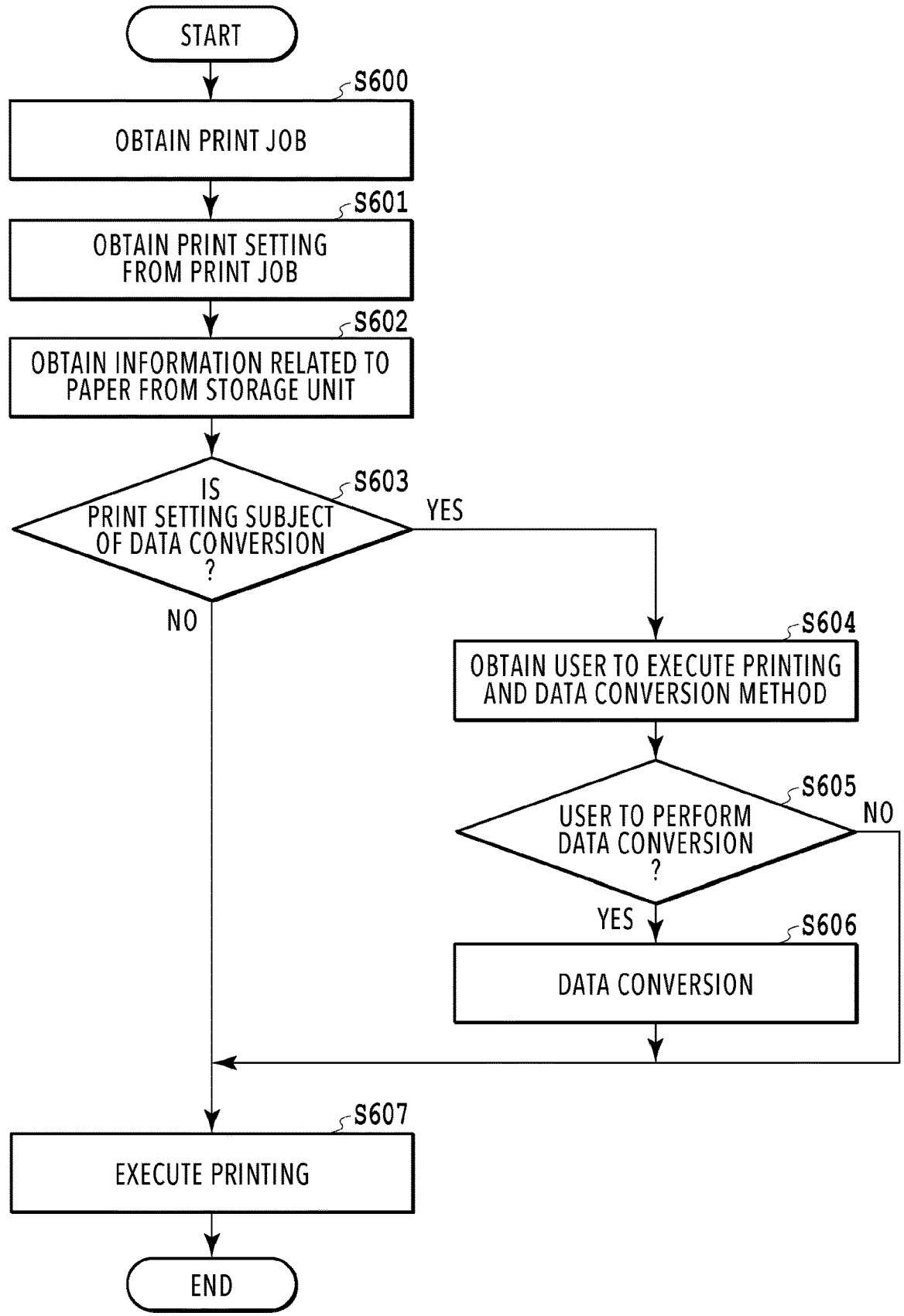
FIG. 6 is a diagram showing a print data conversion processing flow using a print conversion utility.

FIG. 6 is a diagram showing a flowchart of document size conversion processing executed by the print conversion utility 106 in a case of performing borderless printing using the OS standard print function. More specifically, FIG. 6 shows a processing flow in which the print control unit 150 of the print conversion utility 106 generates print data to be sent to the printer via the NW communication control unit. Although the print conversion utility 106 will be described below as the subject of respective steps, the CPU 11 actually executes a corresponding program, thereby realizing a corresponding function.

The processing flow in FIG. 6 is started by selection of the print button 409 by the user on the print setting screen 400 to obtain the print job by the print conversion utility 106. A printer to be used is selected by the user in the printer selection item 401 on the print setting screen 400, whereby the OS print system 102 sends the print data to the selected printer. For example, in a case where the printer 110 is selected in the printer selection item 401, the print data is directly sent to the printer 110 and in a case where the printer 130 not compatible with the OS standard print function is selected, the print data is sent to the virtual printer 105. In the present embodiment, the processing flow of the print conversion utility 106 will be described with reference to the flowchart of FIG. 6. The sign "S" in the descriptions of the respective steps means a step in the flowchart (the same applies hereinafter in the present specification).

In S600, the print conversion utility 106 obtains the print job from the OS print system 102 and the process proceeds to S601. The print job includes document data in addition to various kinds of data shown in FIG. 7 to be described later. Although it is impossible to specify the original size of the document data, the print conversion utility 106 receives the document data in the regular size such as A2 and A3. The print job obtained by the print conversion utility 106 from the OS print system 102 will be shown in FIG. 7. FIG. 7 is a diagram showing a part of a print job of IPP, which is the standard print protocol. A print job 700 includes information about the address of a source PC 701, a printer to execute printing 702, the name of a user to execute printing 703, a paper size 704, a paper feeding method 711, and the kind of paper 712. Further, the paper size 704 includes a lateral size 705, a longitudinal size 706, a bottom margin size 707, a left margin size 708, a right margin size 709, and a top margin size 710. FIG. 7 shows as an example a print job in a case of executing printing at print setting selected by the user on the print setting screen 400.

In S601, the print conversion utility 106 obtains the paper size 704 from the print job 700 obtained in S600 and the process proceeds to S602. In S602, the print conversion utility 106 obtains from the storage unit 108 the information related to paper shown in FIG. 2 including information related to the paper sizes of the printer. Normally, in a case where the user selects the borderless printing by the OS standard print function, the oversize printing is performed.

However, as described above, some users who are used to the print setting screen provided by the vendor driver 124 select the borderless printing based on the assumption that the protruding borderless printing is performed. In that case, a print result would be different from a result assumed by the user. On the other hand, some printers to perform printing, in the first place, are not provided with such setting (that is, borderless print setting or oversize setting by the vendor driver 124) as to produce different print results. In such a case, the above-described problem will not occur. Thus, in S602, the information related to paper of the printer selected by the user is obtained.

In S603, the print conversion utility 106 determines whether a condition for the conversion of the print data is satisfied according to the paper size 704 included in the print job and the presence of a set borderless size corresponding to the paper size 704 included in the information related to paper. The information related to paper in FIG. 2 includes a regular size and an irregular size corresponding to the regular size as shown in FIG. 2. For example, as to the regular size "A2," in addition to A2, "A2 Oversize" and "A2 Borderless" are associated with A2 as the irregular sizes of A2. In S603, the paper size 704 included in the print job is first compared with the information related to paper in FIG. 2 to specify a corresponding regular size. The print conversion utility 106 then determines whether there exists an irregular size corresponding to the specified regular size. If there exists the irregular size corresponding to the regular size, as described above, since there is a possibility that printing which is not intended by the user is performed, the print conversion utility 106 determines that the condition for the conversion of the print data is satisfied. If the print setting satisfies the condition for the conversion of the print data as described above, the process proceeds to S604. If this is not the case, the process proceeds to S607. For example, if the printing apparatus cannot mount paper (303×426 mm) for performing the protruding borderless printing on A3 paper, although the printing apparatus can perform oversize printing for the same size as the A2 regular size, the printing apparatus cannot perform A3 borderless printing. In that case, A3 Borderless is not registered with the information related to paper and by causing A3 Borderless not to exist, it is determined that A3 Borderless is not print setting to be the subject of the print data conversion. If there exists the borderless size corresponding to the paper size, it is determined that a paper size selected by the user in the print setting is the subject of document data conversion and the process proceeds to S604.

In S604, in order to determine in what manner data conversion is performed on the print setting which is the subject of the data conversion, a data conversion method determined in advance according to information about the user who has executed the printing and the user is obtained. The information about the user who has executed the printing can be obtained from the printer to execute printing 702 and the name of the user to execute printing 703 included in the print job 700 obtained in S600. In the example of FIG. 7, it is determined that "User A" makes an instruction to execute printing by "Printer 1."

FIG. 8 is a diagram showing a data conversion method used by the print conversion utility 106 in a case where the user using the print conversion utility 106 performs the borderless printing by the OS standard print function. A list shown in FIG. 8 is referred to as a data conversion method list 800 below. The data conversion method list 800 may be retained in advance in the storage unit 108 of the print conversion utility 106, or may be obtained and retained through communication with the printer. FIG. 8 shows user setting information determined in advance according to the user based on a print history or the like for obtaining the data conversion method.

The data conversion method list 800 includes a registered user 801 registered with the print conversion utility 106, a not-registered user 802 not registered with the print conversion utility 106, and a registered printer 803 registered with the print conversion utility 106. FIG. 8 shows as an example a data conversion method list in a case where User A, User B, and User C are registered with the registered user 801, and Printer 1, Printer 2, and Printer 3 are registered with the registered printer 803. "Expansion" in FIG. 8 indicates that the protruding borderless printing is performed and a document of a regular size is subjected to the enlarging processing to execute printing. "Equal" indicates that the oversize printing is performed and printing is executed with the document of the regular size kept unmagnified. Such user setting information may be, for example, set by the user himself/herself in advance, or may be automatically set based on the print history of the printer to be used. For example, in a case where the user executed the protruding borderless printing in the past, there is a high possibility that the user performs the protruding borderless printing, not the borderless printing by the OS standard print function using the OS standard print function. Also as to the document data, there is a high possibility that the user prepares document data larger than the regular size to make the print instruction to the OS print system 102. As described above, the document data is reduced in the OS print system 102 and the reduced document data is sent to the print conversion utility 106. Thus, the print conversion utility 106 performs processing of enlarging the document data such that the protruding borderless printing can be executed. In the present embodiment, the user setting information is used for such switching between processing.

As has been described above, in S604, the user to execute printing and the printer to execute printing included in the print job 700 and the data conversion method list 800 are obtained and the process proceeds to S605.

In S605, it is determined whether the user who has executed the printing is the user who is the subject of the document data conversion. If the user who has executed the printing is Expansion with respect to the printer to execute printing in the data conversion method list 800 obtained in S604, the user who has executed the printing is the user who is the subject of the data conversion performing the enlarging processing. Since in the above case, the User A to execute printing executes printing by the Printer 1, it is determined that the User A is the user performing the document data conversion and the process proceeds to S606. If the user who has executed the printing is Equal with respect to the printer to execute the printing in the data conversion method list 800, it is determined that the user who has executed the printing is not the user performing the document data conversion so as to perform the unmagnification processing and the process proceeds to S607 to execute the printing.

In S606, processing in which the document data is converted to the size "Borderless" obtained in S601 is performed on the print data obtained in S600 and the process proceeds to S607 to execute the printing.

In S607, the print conversion utility 106 sends the print data to the printer via the NW communication control unit (the NW communication control unit 105*a* and the NW communication control unit 104) to end the processing. As described above, the print data to be sent is the data generated as the print data in the first format.

This makes it possible to perform the borderless printing with the document data used in a case of the borderless printing or the oversize printing of the vendor driver 124 even in a case where the user uses the normal printing. Therefore, the desired print result can be obtained. In other words, since the enlarging processing (protruding borderless printing) or the unmagnification processing (oversize printing) according to the user is performed on the document data received in the regular size by the OS standard print function, it is possible to obtain the desired print result with no need for the user to be careful.

Figure 9:
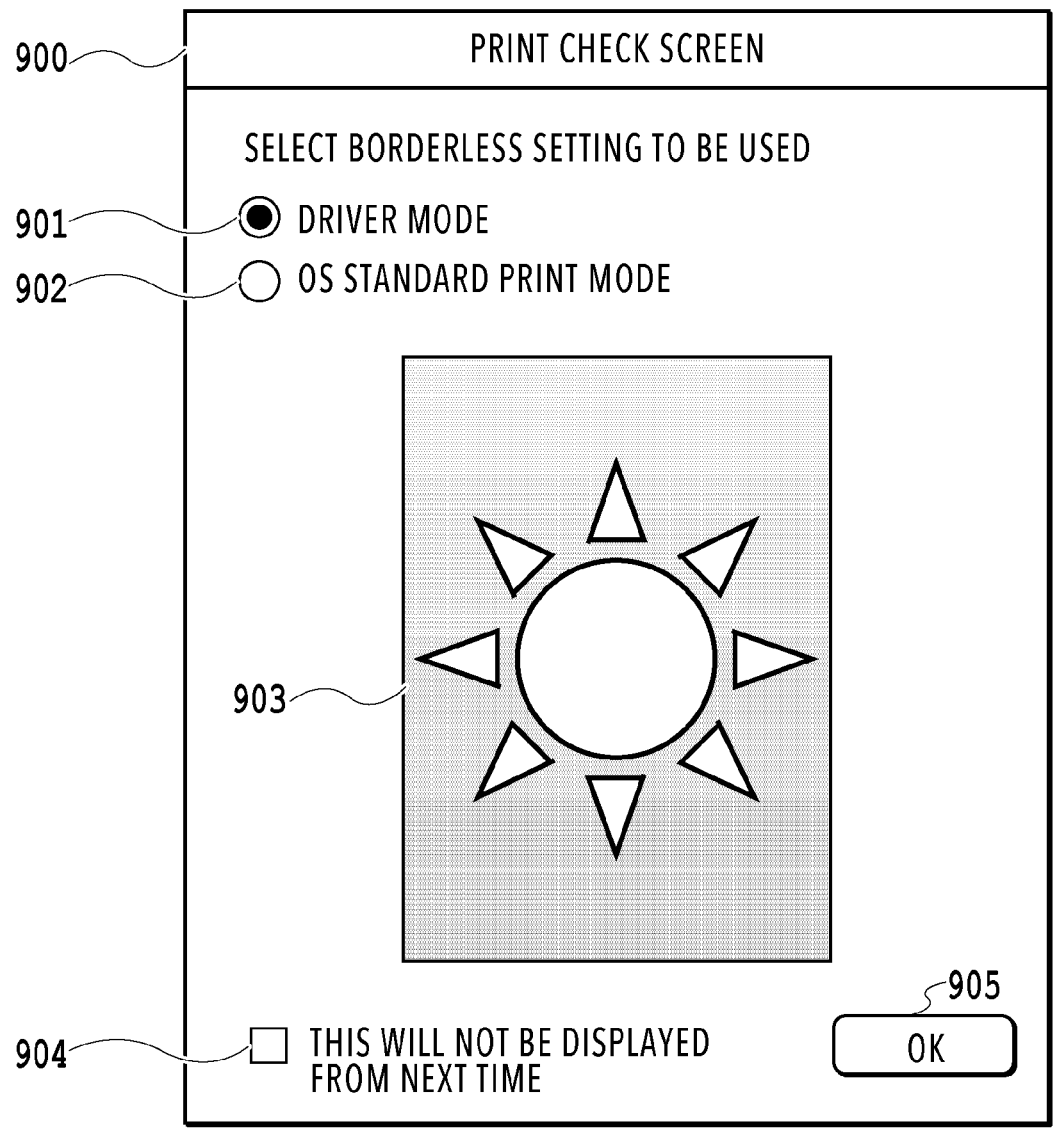
FIG. 9 is a diagram showing a print check screen displayed by a display unit of the print conversion utility.

FIG. 9 is a diagram showing a print check screen displayed by the display unit 109 of the print conversion utility 106. In S605, it is also possible to make it easier for the user to check data conversion processing by displaying the print check screen as shown in FIG. 9 by the display unit 109 of the print conversion utility 106 without using the data conversion method list 800 in FIG. 8. A print check screen 900 shown in FIG. 9 includes a driver mode button 901 and an OS standard print mode button 902. The user can set a mode by selecting either of the buttons and a print result preview 903 according to the selection state of the above button is displayed. In a case where the enlarging processing is performed in a case of the borderless printing, the driver mode button 901 is selected and in a case where the unmagnification processing is performed in a case of the borderless printing, the OS standard print mode button is selected. The buttons may be referred to as any names as long as the difference between the two modes can be seen. Or a display form to clarify whether the document data is enlarged or whether the document data is unmagnified to be output may be applied.

Further, the print check screen 900 is displayed in a state where either of the mode buttons is selected according to the user. At that time, it is also possible to change a button to be selected by user operation. In a case of changing the button as described above, the print conversion utility 106 performs the enlarging processing or the unmagnification processing of the document data according to the selected button to display an image of the print result in the print result preview 903.

The flow in FIG. 6 in a case of using the print check screen 900 in FIG. 9, not the data conversion method list 800 in FIG. 8 will be described below. Since S600 to S604, S606, and S607 are the same as the steps in the flow described above, descriptions thereof will be omitted. In S605, if an OK button 905 is pushed in a state where the driver mode button 901 is selected, the process proceeds to S606 to perform the enlarging processing on the document data in a case of printing. In addition, in S605, if the OK button 905 is pushed in a state where the OS standard print mode button 902 is selected, the process proceeds to S607 to execute the printing because it is not necessary to convert the size of the document data in a case of printing and after that the process ends. By pushing the OK button 905 in a state where a non-display check box 904 is on, setting that the print check screen 900 will not be displayed in S605 is stored in the storage unit 108.

Although the case where the "A2 borderless size" is selected by the user has been described above as an example, the present embodiment is not limited to this. For example, it is also possible to apply the present embodiment to a case where selection of the paper size is the "A3 borderless size" by obtaining the lateral size 705 and the longitudinal size 706 from the print job 700 in S601 to determine corresponding information about the borderless size from the list of FIG. 2. In a case where the "A3 borderless size" is selected as the paper size to execute printing, the lateral size 705 included in the print job 700 is "29700" and the longitudinal size 706 is "42000." The item of "A3 Oversize" in the list of FIG. 2 stored in the storage unit 108 is referred to based on these pieces of size information and since there further exists "A3 Borderless" as the corresponding information about the borderless size, it is determined that the "A3 borderless size" is setting which is the subject of the document data conversion.

As has been described above, according to the present embodiment, it is possible to obtain the desired print result in a case of printing by the printer not compatible with the OS standard print function. More specifically, the print conversion utility 106 performs the data conversion processing according to the user to execute the printing and the printer based on the information about the borderless size corresponding to the print size selected by the user. This can solve a complication in a case of printing, for example, a complication in which it is difficult to know which paper size to select. This can also prevent a situation where although the selected paper size is the same, a desired print result will not be produced depending on a user. Although description has been given in a case of using the A2 size above, the same applies in a case of using other sizes such as A3.

In the present embodiment, "A2 borderless" displayed in 411 and "426×600 mm" displayed in 410 in FIG. 4 bring the same print result to the user registered as "Expansion" with the data conversion method list 800. This is because for the user registered as "Expansion" with the data conversion method list 800, both of "A2 borderless" in 411 and "426× 600 mm" in 410 are the protruding borderless printing by the vendor driver 124. Thus, it is not necessary to display "426×600 mm" in 410 for the user registered as "Expansion" with the data conversion method list 800 as described above. Not displaying "426×600 mm" in 410 can solve difficulty in understanding the conversion method. The information about paper sizes supported by the OS print system 102 is notified in a case of generating the print queue of the OS print system 102. Therefore, in order not to display "426×600 mm" in 410, it is necessary to obtain a conversion method (in this case, "Expansion") selected by a user who is the subject of data conversion before generation of the print queue of the OS print system 102.

Second Embodiment

Next, a second embodiment will be described. In the first embodiment, in a case where there is a borderless size corresponding to the paper size selected by the user in an item which can be set by the printer to perform printing, the print conversion utility 106 performs the enlarging processing or the unmagnification processing according to the user who has executed the printing and the printer. On the other hand, in a case where printing is performed according to a printer by a specific paper feeding method or using a specific kind of paper, margins larger than an ordinary margin size are sometimes necessary. In the second embodiment, the print conversion utility 106 changes the margin size in response to the print setting of the paper feeding method or the kind of paper, thereby performing, on the print data, conversion processing in which the document data is reduced.

In the following descriptions, explanations common to the first embodiment and the second embodiment will be omitted and only a different respect will be described. More specifically, the processing flow of the print conversion utility 106 will be described below as the respect in which the second embodiment is different from the first embodiment.

FIG. 10 is a diagram showing a method of converting the margin size by the print conversion utility 106 for the paper size designated by the user using the print conversion utility 106. A margin size conversion method list 1000 may be retained in advance in the storage unit 108 of the print conversion utility 106 or a margin size conversion method may be obtained and retained through communication with the printer. The margin size conversion method list 1000 includes print setting 1001, other print setting 1002, and a registered printer 1003 registered with the print conversion utility 106.

In FIG. 10, as an example, the print setting 1001 in the margin size conversion method list 1000 uses two lines to show items because the printer needs a margin size each for two kinds of print setting which are Photo Paper and Tray in the print setting 1001. The margin size conversion method list also shows that Printer 1, Printer 2, and Printer 3 are registered with the registered printer 1003. "Margin: 600" in FIG. 10 means that top, bottom, right, and left margin sizes of paper in FIG. 2 are 600 and "margin: 300" means that the top, bottom, right, and left margin sizes of paper in FIG. 2 are 300. Although the top, bottom, right, and left margin sizes are set equal here as an example, values may also be designated to the respective top, bottom, right, and left margin sizes. Further, a different margin size may also be designated according to the paper size.

Figure 11:
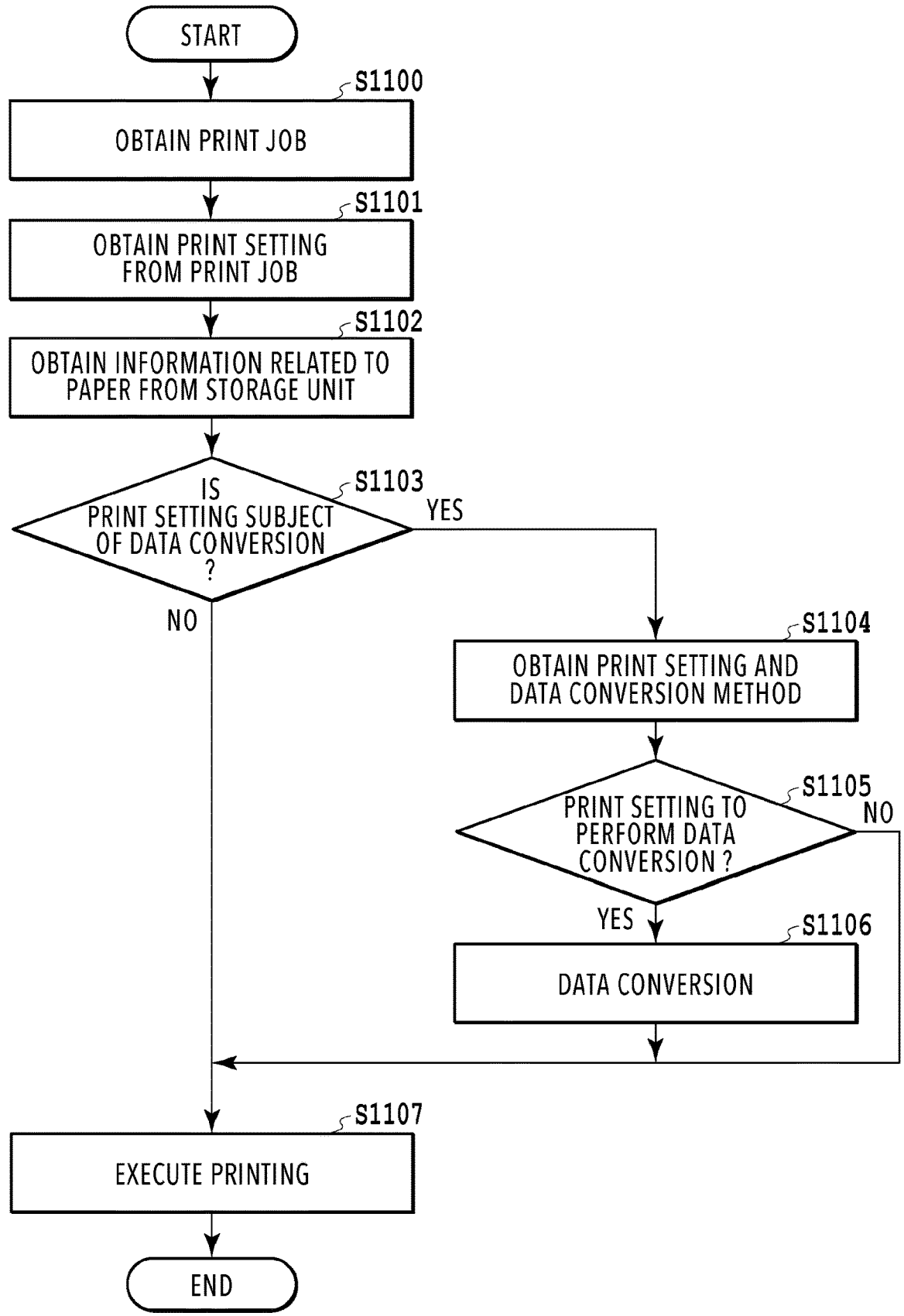
FIG. 11 is a diagram showing a margin size conversion processing flow using the print conversion utility.

FIG. 11 shows a flowchart of processing executed by the print conversion utility 106. More specifically, FIG. 11 shows a processing flow in which the print control unit 150 of the print conversion utility 106 generates print data to be sent to the printer via the NW communication control unit. Although the print conversion utility 106 will be described below as the subject of respective steps, the CPU 11 actually executes a corresponding program, thereby realizing a corresponding function.

The processing flow in FIG. 11 is started by selection of the print button 409 by the user on the print setting screen 400 to obtain the print data by the print conversion utility 106. Since S1100, S1101, and S1107 in FIG. 11 are the same as S600, S601, and S607 in FIG. 6 of the first embodiment, descriptions thereof will be omitted. The print conversion utility 106 obtains the print job 700 in S1100, and obtains the paper size 704 from the print job 700 in S1101, and the process proceeds to S1102.

In S1102, the print conversion utility 106 obtains from the storage unit 108 the information related to paper of the printer shown in FIG. 2. The print conversion utility 106 obtains, from the above list, information related to top, bottom, right, and left margin sizes corresponding to the paper size 704 obtained in S1101 and the process proceeds to S1103. For example, in a case where the paper size selected by the user on the print setting screen 400 is "A2" size, the lateral size 705 included in the print job 700 is "42000" and the longitudinal size 706 is "59400." Further, the bottom margin size 707, the left margin size 708, the right margin size 709, and the top margin size 710 included in the print job 700 are "300," respectively.

In S1103, the print conversion utility 106 determines whether the setting of the print data obtained in S1101 is to be converted. That is, the print conversion utility 106 determines whether the setting of the print data is to be converted according to information about margin sizes of an area corresponding to the print data included in the information related to paper obtained in S1102. If the top, bottom, right, and left margin sizes corresponding to the paper size are zero, the oversize printing or the protruding borderless printing is performed, and in a case of such printing, no margin is necessary in the print result. Therefore, it is determined that the paper size selected by the user in the print setting is not a print setting which is the subject of margin size conversion and the process proceeds to S1107 to execute the printing. If the top, bottom, right, and left margin sizes corresponding to the paper size are other than zero, it is determined that the paper size selected by the user in the print setting is the subject of the margin size conversion and the process proceeds to S1104.

In S1104, the print conversion utility 106 obtains the margin size conversion method list 1000 shown in FIG. 10 in order to determine a document data conversion method according to print setting of a paper feeding method or the kind of paper for print setting which is the subject of data conversion and the process proceeds to S1105. In S1105, the print conversion utility 106 determines, based on the obtained margin size conversion method list 1000, whether the print setting is print setting in which the margin size conversion is performed. For making the above determination, the print conversion utility 106 obtains from the print job 700 the paper feeding method 711 and the kind of paper 712.

A case where the A2 size, photograph paper, and manual feed are set as the paper size 402, the kind of paper 405, and the paper feeding method 406 on the print setting screen 400, respectively to perform printing will be described as an example. In a case of performing printing after making the above setting, it is determined from the information about the paper size 704 included in the print job 700 that the print setting is the "A2" size in the list of FIG. 2. In addition, the paper feeding method 711 included in the print job 700 is "tray" based on the setting of the paper feeding method 406 and the kind of paper 712 included in the print job 700 is "Photo Paper" based on the setting of the kind of paper 405.

Here, the print conversion utility 106 obtains information that the top, bottom, right, and left margin sizes are 600 from the print setting 1001 included in the margin size conversion method list 1000 in FIG. 10. Since the top, bottom, right, and left margin sizes included in the print job 700 are 300 and are different from the top, bottom, right, and left margin sizes 600 in the obtained margin size conversion method list 1000, it is determined that this is the print setting in which the margin size conversion is performed and the process proceeds to S1106. In a case where the paper feeding method 711 and the kind of paper 712 included in the print job 700 correspond to none of the items of the print setting 1001, the print conversion utility 106 obtains top, bottom, right, and left margin sizes in the other print setting 1002. In that case, since the above margin sizes are the same as the top, bottom, right, and left margin sizes included in the print job 700, it is determined that this is not the print setting in which the margin size conversion is performed and the process proceeds to S1107 to execute the printing.

In S1106, processing in which the print data is converted to the top, bottom, right, and left margin sizes of the paper size obtained in S1105 is performed on the print data obtained in S1100, the process proceeds to S1107 to execute the printing, and after that the process ends.

As has been described above, according to the present embodiment, the document data is converted according to the print setting by the user such as the paper feeding method or the kind of paper without taking time and effort by the user so as to make appropriate margin sizes and thus, the desired print result can be obtained.

Third Embodiment

Next, a third embodiment will be described. In the first embodiment, the document data conversion method in a case where the user registered with the print conversion utility 106 uses the printer registered with the print conversion utility 106 is obtained from the data conversion method list stored in the storage unit 108. On the other hand, depending on the printers, in some cases, the borderless printing is performed with the four edges, which are top, bottom, right, and left edges, protruding from the paper using the document size larger than the regular size or the document size which is the same as the regular size has to be used because the borderless printing with the four edges, which are top, bottom, right, and left edges, protruding from the paper cannot be performed. Further, there is a case where it is necessary to change the data conversion method according to the user. In the third embodiment, processing in which the document data conversion method is changed based on the registered user or the registered printer depending on the respective scenes is performed.

In the following descriptions, explanations common to the first embodiment and the third embodiment will be omitted and only a different respect will be described. More specifically, generation processing of the data conversion method list 800 before execution of printing and data conversion method determination processing S605 in the processing flow of the print conversion utility 106 will be described below as the respect in which the third embodiment is different from the first embodiment.

Figure 12:
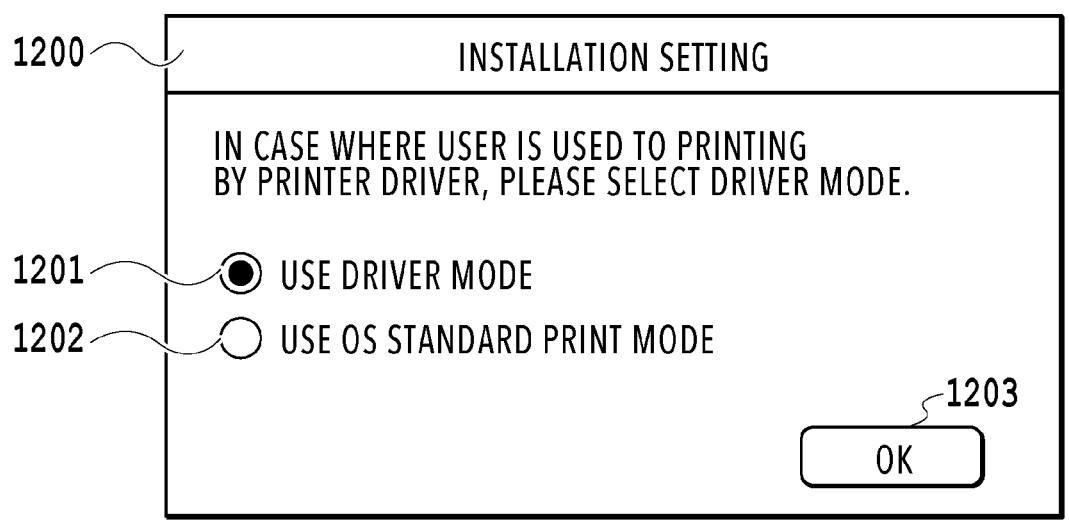
FIG. 12 is a diagram showing an installation setting screen displayed by the display unit of the print conversion utility.

FIG. 12 is a diagram showing an installation setting screen displayed by the print conversion utility 106 in a case of activation of the virtual printer 105. Even in a case where the user uses the printer not compatible with the OS standard print function using the OS standard print function, the user can select this printer not compatible with the OS standard print function on the setting screen displayed by the display unit 109 of the print conversion utility 106. The print conversion utility 106 activates the virtual printer 105 to display the installation setting screen in the display unit. An installation setting screen 1200 includes a driver mode button 1201 and an OS standard print mode button 1202 and the user can select either of the buttons only. In a case where an OK button 1203 is pushed in a state where the driver mode button 1201 is selected, it is determined that this printer is the printer performing the enlarging processing in a case of setting the borderless printing and information about Expansion is stored in the registered printer 803 in the data conversion method list 800. In a case where the OK button 1203 is pushed in a state where the OS standard print mode button 1202 is selected, it is determined that this printer is the printer performing the unmagnification processing in a case of setting the borderless printing and information about Equal is stored in the registered printer 803 in the data conversion method list 800. Although a state where the driver mode button 1201 is selected is displayed as an example on the installation setting screen 1200 in FIG. 12, a mode selected at an initial state may be determined based on a paper size set in the printer or information about printing performed by the user in the past.

Additionally, in a case where the paper size set in the main body of the printer can be obtained via the NW communication control unit, the generation processing of the data conversion method list 800 may be performed by determining whether the obtained paper size is the regular size. In a case where the paper size is the regular size, it is determined that the borderless printing is performed by performing printing with the four edges, which are top, bottom, right, and left edges, of the document data larger than the regular size protruding from the paper and the information about Expansion is stored in the registered printer 803 in the data conversion method list 800. In a case where the paper size is not the regular size, it is determined that the oversize printing is performed by printing the document data of the regular size on paper of the paper size larger than the regular size and the information about Equal is stored in the registered printer 803 in the data conversion method list 800. In a case where the information about printing performed by the user in the past can be obtained from the main body of the printer via the OS print system 102 or the NW communication control unit, determination may be made as to whether the enlarging processing is performed or whether the unmagnification processing is performed according to the obtained print information.

Figure 13:
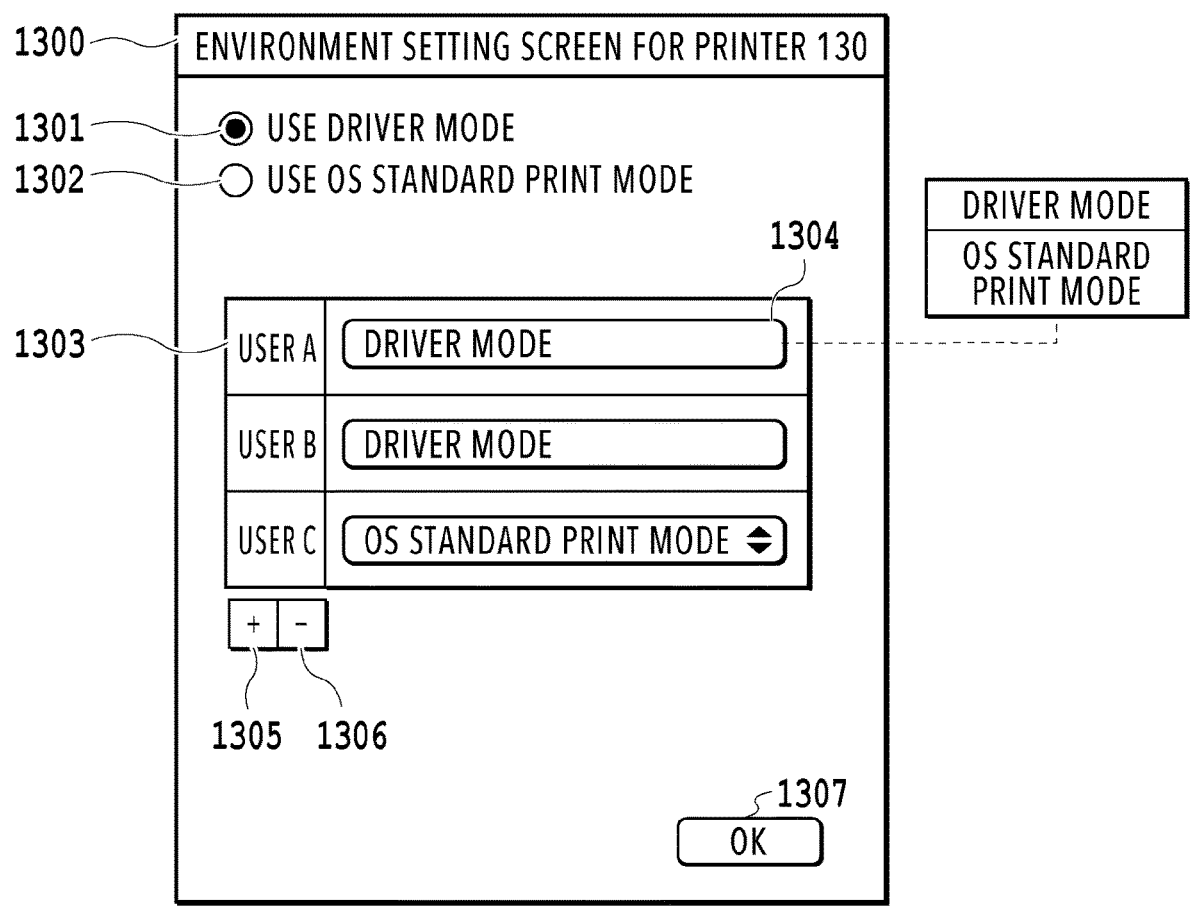
FIG. 13 is a diagram showing a printer environment setting screen displayed by the display unit of the print conversion utility.

FIG. 13 is a diagram showing an environment setting screen for making setting for the printer after activation of the virtual printer 105 by the print conversion utility 106. An environment setting screen 1300 includes a driver mode button 1301 and an OS standard print mode button 1302 and the user can select either of the buttons only. In a case where an OK button 1307 is pushed in a state where the driver mode button 1301 is selected, it is determined that this printer is the printer performing the enlarging processing in a case of setting the borderless printing and the information about Expansion is stored in the registered printer 803 in the data conversion method list 800. In a case where the OK button 1307 is pushed in a state where the OS standard print mode button 1302 is selected, it is determined that this printer is the printer performing the unmagnification processing in a case of setting the borderless printing and the information about Equal is stored in the registered printer 803 in the data conversion method list 800. User information 1303 included in the environment setting screen 1300 indicates a user using the virtual printer 105 activated by the print conversion utility 106. It is possible to add a user by pushing a user addition button 1305 and it is possible to delete the selected user by pushing a user deletion button 1306 in a state where the user included in the user information 1303 is selected. A data conversion processing method for the user can be determined by setting a data conversion processing selection item 1304 for each of the users registered with the user information 1303. On the environment setting screen 1300 in FIG. 13, as an example, a driver mode is set for User A and User B and an OS standard print mode is set for User C. By making the above setting, the data conversion method for each of the users as shown in the data conversion method list 800 in FIG. 8 can be set.

Figure 14:
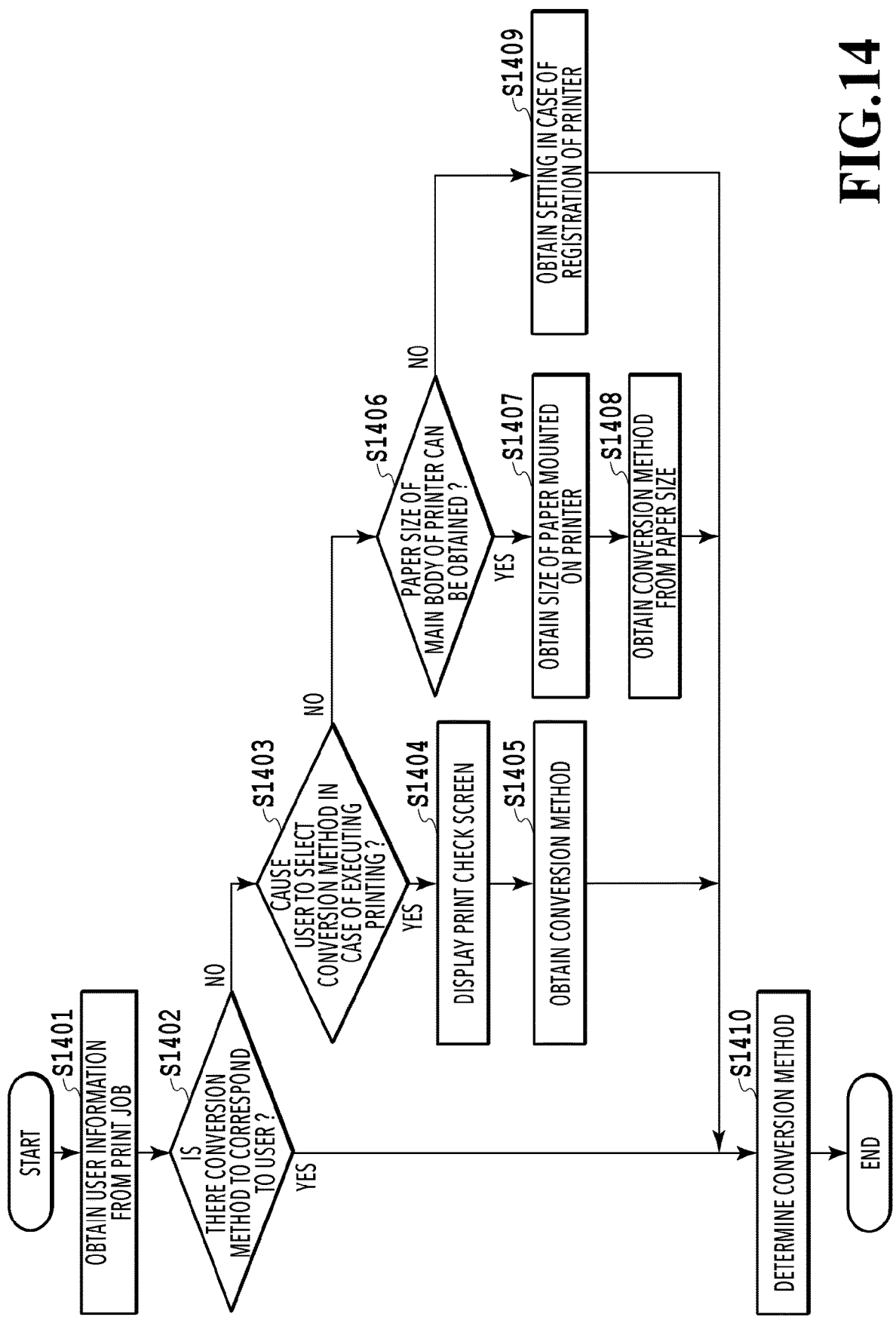
FIG. 14 is a diagram showing a processing flow for determining a print data conversion method using the print conversion utility.

FIG. 14 shows a flowchart of the data conversion method determination processing executed by the print conversion utility 106. More specifically, FIG. 14 shows a processing flow in which the print conversion utility 106 determines in S605 the data conversion method. Although the print conversion utility 106 will be described below as the subject of respective steps, the CPU 11 actually executes a corresponding program, thereby realizing a corresponding function. The processing flow in FIG. 14 is started by executing the processing in which the data conversion method is determined in S605.

In S1401, the print conversion utility 106 obtains the user information from the print data obtained in S600 and the process proceeds to S1402. In S1402, the print conversion utility 106 refers to the data conversion method list 800 to determine whether the data conversion method for the user information exists. If the data conversion method exists, the process proceeds to S1410 and if there exists no user information or no data conversion method in the data conversion method list 800, the process proceeds to S1403.

In S1403, the print conversion utility 106 determines whether setting is made such that in a case of executing printing, the user is caused to select the document data conversion method. That is, the print conversion utility 106 refers to the storage unit 108 to determine whether setting to display the print check screen 900 is allowed. If the setting to display the print check screen 900 is allowed in S1403, the process proceeds to S1404. In S1404, the print conversion utility 106 displays the print check screen 900 and the user pushes the OK button 905, whereby the process proceeds to S1405. In S1405, the print conversion utility 106 obtains the conversion method set by the user on the print check screen 900 and the process proceeds to S1410. If the setting to display the print check screen 900 is not allowed in S1403, the process proceeds to S1406 to display the print check screen 900. In S1406, the print conversion utility 106 determines whether the information about a paper size can be obtained from the main body of the printer and if the information can be obtained, the process proceeds to S1407 and if the information cannot be obtained, the process proceeds to S1409.

In S1407, the print conversion utility 106 obtains the size of paper mounted on the printer and the process proceeds to S1408. In S1408, the print conversion utility 106 obtains the conversion method from the obtained paper size. As to the conversion method, in a case where the paper size is the regular size, it is determined that printing with four edges of the borderless size document protruding from the paper (that is, the protruding borderless printing) is performed. Thus, the enlarging processing is obtained as the conversion method and the process proceeds to S1410. In a case where the paper size is not the regular size, it is determined that printing is performed on paper larger than the regular size (that is, the oversize printing). Thus, the unmagnification processing is obtained as the conversion method and the process proceeds to S1410. In S1409, the print conversion utility 106 obtains from the storage unit 108 the setting made on the installation setting screen 1200 and the process proceeds to S1410. In S1410, the print conversion utility 106 determines the data conversion method and the process proceeds to S1411 to end the processing.

By performing the above processing, it is possible to change the conversion processing held in the data conversion method list according to the registered user or the registered printer and print setting desired by the user can be flexibly performed. Therefore, convenience is improved.

As has been described above, according to the present embodiment, the print conversion utility 106 can change the document data conversion method according to checking with the user in a case of executing printing, the paper setting of the main body of the printer, or setting in a case of installation and thus, the convenience is improved.

Although the print system according to the first to third embodiments has a configuration in which a PC and a printer are connected with each other via a particular bi-directional interface, the print system is not limited to this example. In other words, the print system may be an apparatus-integrated print system in which the functions of the PC and the printer are integrated.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-030369, filed Feb. 26, 2021, which is hereby incorporated by reference herein in its entirety.

What is claimed is:

1. An information processing apparatus capable of generating print data in a first format and communicating with a printing apparatus, the information processing apparatus comprising:
at least one memory and at least one processor and/or at least one circuit which function as:
a first obtaining unit configured to obtain, from OS standard print software which operates in a computer, print data in a second format different from the first format, the print data in the second format comprising document data and print setting by a user;
a second obtaining unit configured to obtain paper information related to paper indicating a paper size supported by the printing apparatus, wherein the paper information includes information about a plurality of groups of sizes including a first group of sizes corresponding to a first regular size and a second group of sizes corresponding to a second regular size;
a processing unit configured to process the print data such that a size of the document data is enlarged in a case where the print setting by the user indicates borderless printing and a predetermined condition is satisfied; and
a control unit configured to perform control to generate the processed print data as the print data in the first format including the enlarged document data processed by the processing unit and to perform control to send the generated print data to the printing apparatus, wherein, in case that the first group of sizes corresponds to the obtained print setting among the plurality of groups of sizes, and a second size of a first size and the second size is not included in the first group of sizes, the processing unit performs control not to process the print data such that a size of the document data is enlarged, the first size is the first regular size and defined to have zero margins and the second size is larger than the first regular size and defined to have zero margins.

2. The information processing apparatus according to claim 1, wherein the predetermined condition comprises a condition based on the user included in the print setting.

3. The information processing apparatus according to claim 2, wherein the at least one memory and the at least one processor and/or at least one circuit further function as:
a third obtaining unit configured to obtain user setting information in which whether or not to perform processing by the printing apparatus is set for each of the users,
wherein the predetermined condition comprises a condition that the user included in the print setting is a user who has to perform the enlarging processing in the user setting information.

4. The information processing apparatus according to claim 1, wherein
the at least one memory and the at least one processor and/or at least one circuit further function to:
set a first mode in which the processing of the print data is performed in a case where the predetermined condition is satisfied, or a second mode in which the print data is not processed even in a case where the predetermined condition is satisfied,
wherein the processing operates according to a set mode.

5. The information processing apparatus according to claim 4, wherein the mode is set in at least one of a case of installation of print control software, a case of activation of the print control software, or a case of print execution.

6. The information processing apparatus according to claim 1, wherein
the at least one memory and the at least one processor and/or at least one circuit further function to:
obtain information about margin setting in the printing apparatus corresponding to a kind of paper designated in the print setting,
wherein processing is performed in which the document data is reduced in a case where a margin designated in the print setting is less than the obtained margin setting.

7. The information processing apparatus according to claim 1, wherein the print data in which a size of the document data has not been converted is transmitted to the printing apparatus in the first format in a case where the predetermined condition is not satisfied.

8. The information processing apparatus according to claim 1, wherein the first group of sizes is corresponding to one of A2 and A3, and the second group of sizes is corresponding to the other of A2 and A3.

9. A non-transitory computer readable storage medium storing a program for print control software capable of generating print data in a first format, the program causing a computer to:
obtain, from OS standard print software which operates in the computer, print data in a second format different from the first format, the print data in the second format comprising document data and print setting by a user;
obtain paper information related to paper indicating a paper size supported by the printing apparatus, wherein the paper information includes information about a plurality of groups of sizes including a first group of sizes corresponding to a first regular size and a second group of sizes corresponding to a second regular size;
process the print data such that a size of the document data is enlarged in a case where the print setting by the user indicates borderless printing and a predetermined condition is satisfied; and
generate the converted print data as the print data in the first format including the processed enlarged document data and send the generated print data to a printing apparatus,
wherein, in case that the first group of sizes corresponds to the obtained print setting among the plurality of groups of sizes, and a second size of a first size and the second size is not included in the first group of sizes, perform control not to process the print data such that a size of the document data is enlarged, the first size is the first regular size and defined to have zero margins and the second size is larger than the first regular size and defined to have zero margins.

10. The storage medium according to claim 9, wherein the predetermined condition comprises a condition that setting of the irregular size corresponding to the regular size included in the print setting can be made by the printing apparatus.

11. The storage medium according to claim 9, wherein the predetermined condition comprises a condition based on the user included in the print setting.

12. The storage medium according to claim 11, further comprising:
obtaining user setting information in which whether or not to perform processing by the printing apparatus is set for each of the users,
wherein the predetermined condition comprises a condition that the user included in the print setting is a user who has to perform the enlarging processing in the user setting information.

13. The storage medium according to claim 9, further comprising:
setting a first mode in which the processing of the print data is performed in a case where the predetermined condition is satisfied, or a second mode in which the print data is not processed even in a case where the predetermined condition is satisfied,
wherein the processing operates according to a set mode.

14. The storage medium according to claim 13, wherein the mode is set in at least one of a case of installation of the print control software, a case of activation of the print control software, or a case of print execution.

15. The storage medium according to claim 9, further comprising:
obtaining information about margin setting in the printing apparatus corresponding to a kind of paper designated in the print setting,
wherein processing is performed in which the document data is reduced in a case where a margin designated in the print setting is less than the obtained margin setting.

16. The storage medium according to claim 9, wherein the print data in which a size of the document data has not been converted is transmitted to the printing apparatus in the first format in a case where the predetermined condition is not satisfied.

17. A method for controlling an information processing apparatus capable of generating print data in a first format and communicating with a printing apparatus, the method comprising:
obtaining, from OS standard print software which operates in a computer, print data in a second format different from the first format, the print data in the second format comprising document data and print setting by a user;
obtaining paper information related to paper indicating a paper size supported by the printing apparatus, wherein the paper information includes information about a plurality of groups of sizes including a first group of sizes corresponding to a first regular size and a second group of sizes corresponding to a second regular size;

processing the print data such that a size of the document data is enlarged in a case where the print setting by the user indicates borderless printing and a predetermined condition is satisfied; and generating the processed print data as the print data in the first format including the processed enlarged document data and sending the generated print data to the printing apparatus, wherein, in case that the first group of sizes corresponds to the obtained print setting among the plurality of groups of sizes, and a second size of a first size and the second size is not included in the first group of sizes, perform control not to process the print data such that a size of the document data is enlarged, the first size is the first regular size and defined to have zero margins and the second size is larger than the first regular size and defined to have zero margins.

* * * * *